Oct. 10, 1950   M. DESPRES   2,525,118
GRIPPER FOR DOWEL MACHINES
Filed May 12, 1947

INVENTOR
MARCEL DESPRES
BY Liverance and
Van Antwerp
ATTORNEYS

Patented Oct. 10, 1950

2,525,118

UNITED STATES PATENT OFFICE 2,525,118

GRIPPER FOR DOWEL MACHINES

Marcel Despres, Grand Rapids, Mich.

Application May 12, 1947, Serial No. 747,569

1 Claim. (Cl. 142—54)

This invention is directed to a novel feeding gripper for engaging, gripping and periodically feding dowel rods of required lengths, a dowel being cut from the rod between successive feeding movements thereof. The dowel rods used are continuously helically grooved around their outer surfaces, the distance between succeeding grooves in the length of the rod being small. The gripper which I have provided insures certainity in feeding the dowel rod without lost motion, and with little or no penetration at the surface of the rod by the pointed ends of the feeding members used.

It is an object and purpose of the present invention to provide an improvement in dowel rod feeding by gripping engagement thereof by a novel gripper structure which is more certain and accurate in operation than previously used.

Figure 1:
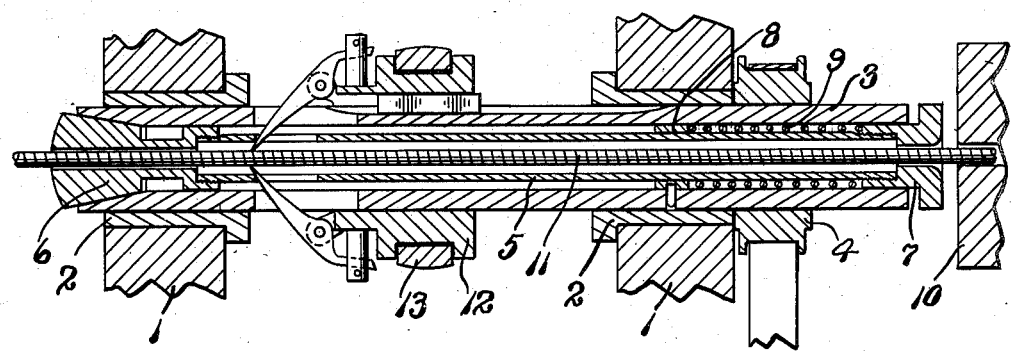
Figure 3:
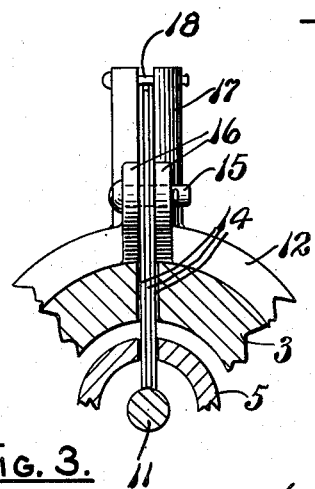
Figure 2:
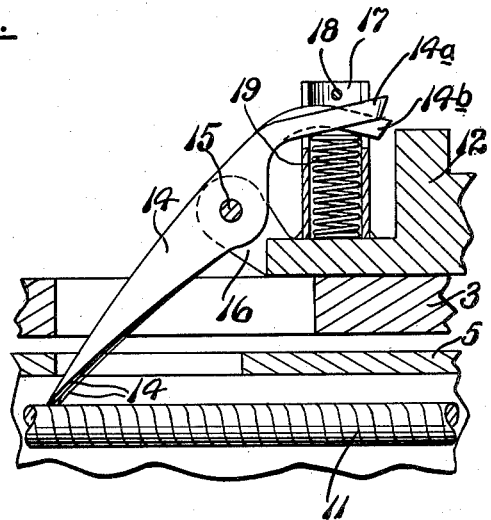
Figure 5:
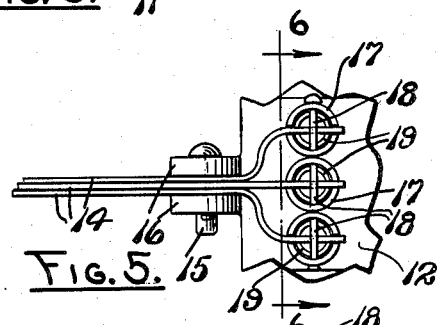
Figure 4:
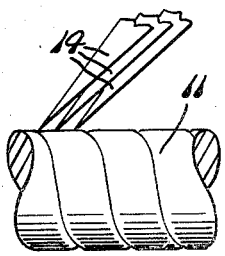

An understanding of the invention may be had from the following description, taken in connection with the accompanying drawing, in which:

Fig. 1 is a longitudinal section through the feeding, guiding and holding mechanism of a dowel machine, Fig. 2 is a fragmentary enlarged like section showing, particularly, the plurality of engaging or gripping fingers slightly separated at the pointed ends thereof where they engage the rod, Fig. 3 is a fragmentary vertical transverse section of the structure in Fig. 2, looking thereagainst from the left, Fig. 4 is a fragmentary, further enlarged, elevation better showing the spacing or separation of the gripper fingers at their pointed ends where they bear against the surface of a dowel rod, Fig. 5 is a fragmentary plan view showing a slight codification in structure from that shown in Figs. 1, 2, and 3, and Fig. 6 is a vertical section and elevation on the plane of line 6—6 of Fig. 5, looking in the direction indicated.

Like reference characters refer to like parts in the different figures of the drawing.

For so much of the dowel machine as is required to show the environment of the invention, spaced vertical supports 1, with suitable bearings 2 passing therethrough, carry a somewhat elongated tubular shaft 3 which extends through the bearings and is rotatably mounted therein. The shaft may be driven by a belt pulley 4 thereon, around which a drive belt is placed. One end of the tubular shaft 3 has an outwardly tapering enlargement of the cylindrical passage therethrough, as shown in Fig. 1.

A tube 5 extends lengthwise of the shaft 3 but is shorter than the shaft. At its end nearest the tapered seat in the shaft 3 described, a dowel rod holding head 6 is connected, preferably by threading thereon. The head is radially split at several spaced places at its outer portion, and has outwardly inclined sides complementary to the tapered conical seat in the adjacent end of the shaft 3. At the opposite end a head 7, having an annular flange at its outer end, is screw connected to the rod 5. A collar 8 between the tube 5 and the shaft 3 is pinned to the shaft and between it and the outer end of the member 7, a coiled compression spring 9 is located, the normal action of which is to move the tube 5 to the right and close the jaws of the head 6 against a dowel rod passing therethrough.

In the operation of the machine, a pressure head 10 which has a central opening through which the dowel rod 11 passes, the member 7 and the head 6 also having axial openings for such passage of the rod, is moved against the flange of the member 7, compressing the spring 9 and moving the rod 5 and the head 6 longitudinally for release of the clamp made by the head 6 upon the rod 11. The dowel rod 11 of the regular length used at its outer surface is grooved with a shallow groove of a continuous helical form as shown. It is during the time that the head 6 releases the rod 11 that it is fed lengthwise beyond said head for the next succeeding transverse cut therethrough, to make a dowel of the required length, and the cutting transversely occurs when the rod is clamped and held securely against movement by the closing of the jaws of the head 6 thereagainst.

On the shaft 3 between the supports 1, a collar 12 is slidably mounted and keyed to the shaft to turn therewith. In the machine operation, in accordance with regular practice, the collar 12 is moved back and forth on the shaft 3 in proper timing with the clamping and releasing of the rod 11 by the head 6, through the actuation of a yoke 13 associated with the collar, the detail of which is old. The collar 12 carries two diametrically opposed series of dowel engaging fingers 14. The fingers 14, as best shown in Fig. 2, are pivotally mounted side by side, between their ends, on a pivot pin 15, which passes through arms or brackets 16 extending from the collar 12. The shaft 13 and the tube 15 are slotted for a distance sufficient for the fingers at their inner end portions to pass through said slots and move back and forth longitudinally of the shaft with the movement of the collar 13. It will be noted that of the three gripper fingers 14 (Fig. 4) they are disposed to bear against the dowel rod 11 in spaced relationship to each other in the direction of the length of the rod, so that in any case, one of the pointed ends of a finger will be very close to the helical groove in the rod, so that when the collar and fingers have been moved to the right and the pointed ends of the fingers have slid over the rod at opposite sides thereof, on the return movement to the left, a finger will engage in a groove substantially instantaneously and there will be no lost movement of the fingers over the rod in the direction of feeding which, if all of the pointed ends of the fingers were located in the same position, might require movement a distance between successive spirals of the groove before engaging therewith.

The upper end portions of the fingers 14 pass through opposed slots at the upper end of a sleeve 17 carried on the collar 12, and within a cross pin 18 at the outer end of the sleeve 17. Between the collar 12 which provides a bottom at the inner end of the sleeve 17 and the inner edges of the fingers, a coiled compression spring 19 is located. The outside fingers of a series, three being in a series as shown, terminate in arms 14a and the middle or intermediate finger at its upper end terminates in an arm 14b (Fig. 2) crossing the arms 14a, so that opposite sides of the upper coil of the spring 19 come against the inner edges of the arms 14a and 14b, respectively, getting a better spring pressure engagement.

Figure 6:
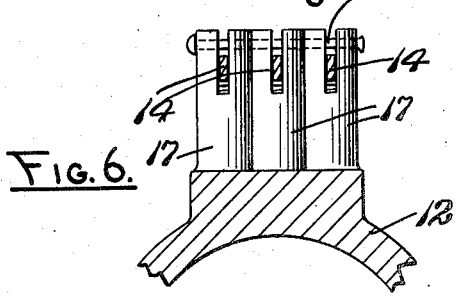

In Fig. 5, instead of a single sleeve 17 and a single spring 19 for each of the series of three of the gripping and feeding fingers, three of such sleeves are used, one for each of the fingers 14, and each having a spring 19 therein. Each of the sleeves is slotted at its outer end portion and the side fingers are laterally offset to reach their respective sleeves and springs, as shown in Figs. 5 and 6. Otherwise, the construction is the same and operates in the same manner.

With the structure described, the gripping of the dowel rod for feeding purposes is better and more surely attained than heretofore. There is a positive gripping and feeding of the rod without the dangers and chances of undesired movement of the gripping fingers without an accompanying movement of the rod when the fingers are moved in the direction of outward feeding. And at the same time, the fingers may be moved in reverse to engage the rod at a place farther back for the next succeeding feeding movement, the pointed ends of the fingers moving freely over the opposed surfaces of the rod.

While the fingers in the groove are shown as three in number, such number may be varied if desired. Similarly, while two series are shown diametrically opposed to each other in Fig. 1, the invention is not necessarily limited to two series of such multiple fingers, but a greater number of such series of fingers may be used.

The invention is defined in the appended claim, and is to be considered comprehensive of all forms of structure coming within its scope.

I claim:

The combination with a dowel machine having guide means for a dowel rod and a carriage mounted for reciprocatory movement in the direction of the length of the dowel rod, of means to grip the dowel rod comprising a plurality of gripping fingers pivotally mounted on the carriage adjacent each other intermediate their ends, said fingers having ends of different lengths extending into engagement with the dowel rod, a single coiled spring mounted on the carriage, said fingers having other ends extending adjacent an end of said spring and being shaped to engage the end of the spring at substantially diametrically opposite points thereof, and means for guiding said spring and said other ends of the fingers.

MARCEL DESPRES.

REFERENCES CITED

The following references are of record in the file of this patent:

UNITED STATES PATENTS

| Number | Name | Date |
|---|---|---|
| 1,792,571 | Brochu | Feb. 17, 1931 |
| 1,838,168 | Anderson et al. | Dec. 29, 1931 |
| 2,031,815 | Berman | Feb. 25, 1936 |

FOREIGN PATENTS

| Number | Country | Date |
|---|---|---|
| 370,902 | Germany | Mar. 8, 1923 |